W. H. SMITH & J. H. KLASSEN.
VEHICLE SPRING.
APPLICATION FILED JUNE 25, 1908.

949,308.

Patented Feb. 15, 1910.

Witnesses
Rudolf Wildenhayn
James T. _____

Inventors
William H. Smith,
Jacob H. Klassen.
by Hazard Krause
Attorneys.

UNITED STATES PATENT OFFICE.

WILLIAM H. SMITH AND JACOB H. KLASSEN, OF LOS ANGELES, CALIFORNIA.

VEHICLE-SPRING.

949,308.　　　　　Specification of Letters Patent.　　Patented Feb. 15, 1910.

Application filed June 25, 1908. Serial No. 440,266.

*To all whom it may concern:*

Be it known that we, WILLIAM H. SMITH and JACOB H. KLASSEN, both citizens of the United States, residing at Los Angeles, in the county of Los Angeles and State of California, have invented new and useful Improvements in Vehicle-Springs, of which the following is a specification.

This invention relates to a vehicle spring of the general character used in automobiles and carriages and the object thereof is to provide a spring which is simple in its construction and particularly in its connection to the vehicle axle and which is not weakened by the passage of any bolts or other securing devices therethrough.

The prime object of our invention is to provide connecting means between the leaves of the spring and the vehicle axle whereby the spring is held in rigid connection with the axle in such a manner that the spring is of full strength throughout its central portion where it is usually weakened by the passage of bolts therethrough. To this end the leaves of the spring are provided with a curved portion in their centers which fit over a curved block and the leaves are thus held from longitudinal movement. Means are provided to hold the leaves of the spring in close contact with the block.

Figure 1:
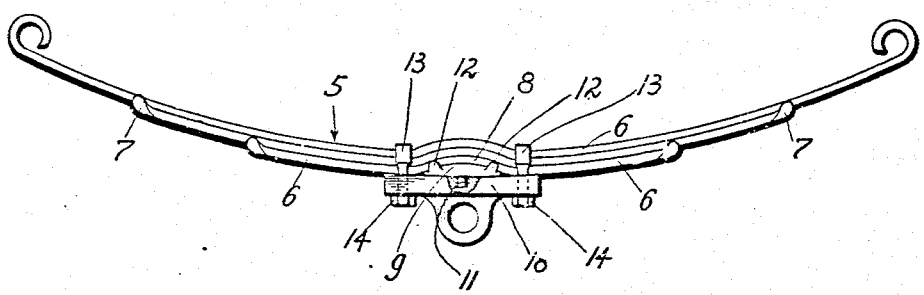
Figure 2:
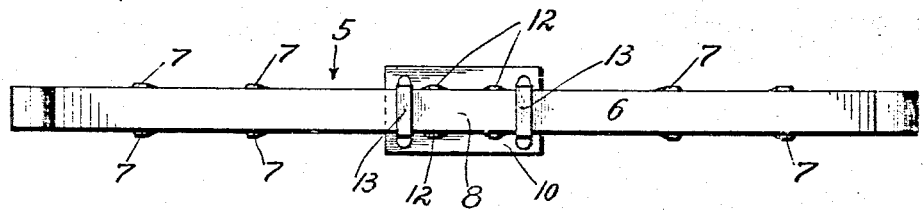
Figure 3:
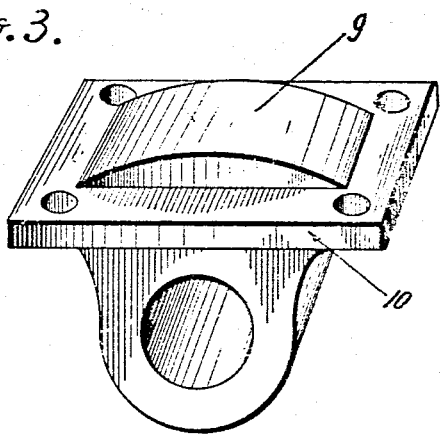

In the accompanying drawings, forming a part of this specification:—Figure 1,—is a side elevation of a spring constructed in accordance with our invention. Fig. 2,—is a plan view of the same. Fig. 3,—is a perspective view of a modified form of axle plate.

In the drawings 5 designates a spring of a generally elliptical type composed of leaves 6 having tabs 7 on their ends to prevent any relative transverse movement of the leaves. In their centers the leaves are provided with bent portions 8 which fit over a block 9 having a curved upper surface of the same curvature as the bent portions of the leaves. Block 9 is set upon axle plate 10 and is connected thereto by means of a pin 11 which fits into an aperture in the upper face of the axle plate. Block 9 is further provided with tabs 12 which prevent any twisting movement of the block under the spring. Yoke bolts 13 pass over leaves 6 at each side of bent portions 8 and pass through axle plate 10 to be secured by nuts 14.

It will be seen that any longitudinal movement of the springs upon the axle plate is positively prevented by the bend in the leaves of the spring fitting over curved block 9. Any upward movement is prevented by yoke bolts 13, the bolts holding the curved portions of the leaves in close engagement with curved block 9. By this construction it will be seen that it is not necessary to weaken the spring by boring holes in it for the passage of bolts or other securing means therethrough and a spring is thus formed of much greater durability than the springs now in use.

In Fig. 3 a perspective view of an axle plate having a curved block 9 formed integrally therewith is shown.

Fig. 1 shows the method of applying our invention to the usual form of axle plate which is slightly curved on its upper surface to correspond with the large curvature of the springs. Curved block 9 is therefore slightly convex upon its under surface. The form shown in Fig. 3 is an axle plate having a flat upper surface and block 9 cast or otherwise made as an integral part therewith. Tabs 12 are omitted in this form as the block is prevented from turning by being formed integral with the axle plate. It is obvious that this form is more easily and cheaply made than the form shown in Fig. 1 and is, therefore, utilized when the axle plate is made in the first instance for the reception of our spring, the form shown in Fig. 1 being used merely if it is necessary to apply our spring to the usual form of axle plate now in use.

Having described our invention, what we claim as new and desire to secure by Letters Patent is:—

1. A vehicle spring construction, comprising in combination with a spring, an axle bearing, said bearing being provided on its upper face with a raised block, said spring being bent and fitting over the raised block, and securing means for the spring on each side of the bent portion.

2. A vehicle spring construction, comprising in combination with a spring, an axle bearing, said bearing being provided on its upper face with a raised block, said spring being provided with a bent portion adapted to fit over said raised block, and yokes passing over the spring at each side of the bend therein and passing through the axle bearing to be secured thereto.

In witness that we claim the foregoing we have hereunto subscribed our names this 17th day of June, 1908.

WM. H. SMITH.
J. H. KLASSEN.

Witnesses:
EDMUND A. STRAUSE,
OLLIE PALMER.